United States Patent [19]

Wolter et al.

[11] 4,376,109
[45] Mar. 8, 1983

[54] PROCESS AND APPARATUS FOR DISPOSAL OF NOXIOUS VAPORS EMANATING FROM WORT AND MASH DURING PRODUCTION OF BEER IN BREWERY INSTALLATIONS

[75] Inventors: Erhard Wolter, Dortmund; Ludwig Wiegleb, Unna-Massen; Roland Krüger; Heinz Ladwig, both of Dortmund; Klaus Ehrlinger, Fröndenberg, all of Fed. Rep. of Germany

[73] Assignees: Holstein & Kappert GmbH; Dortmunder Actien-Brauerei, both of Dortmund, Fed. Rep. of Germany

[21] Appl. No.: 279,047

[22] Filed: Jun. 30, 1981

[30] Foreign Application Priority Data

Jul. 1, 1980 [DE] Fed. Rep. of Germany ....... 3024809

[51] Int. Cl.$^3$ .............................................. C01B 0/00
[52] U.S. Cl. ........................................ 423/659; 55/89; 55/93; 55/222; 55/228; 426/29; 426/492; 165/47; 99/275

[58] Field of Search ................ 55/80, 84, 93, 94, 222, 55/220, 228; 423/659; 99/275; 426/29, 30, 494, 492; 435/93; 165/47, DIG. 12; 34/86

[56] References Cited

U.S. PATENT DOCUMENTS 4,121,541  10/1978  Kneissl et al. ........................ 55/222

FOREIGN PATENT DOCUMENTS 232716    2/1961   Australia ............................... 55/80
2635026   2/1978   Fed. Rep. of Germany ........ 426/29
886902    1/1962   United Kingdom .................... 55/80
137484   10/1960   U.S.S.R. ............................... 55/80

Primary Examiner—Bernard Nozick
Attorney, Agent, or Firm—Toren, McGeady and Stanger

[57] ABSTRACT

Process and apparatus for disposal of noxious vapors emanating in brewery installations from treatment of wort and mash during the production of beer and for recovery of excess energy therefrom which includes passing the vapors emanating from the treatment of wort through a first condenser, passing the vapors emanating from the treatment of mash through a second condenser, and passing at least part of the exhaust emitted from the first condenser through the second condenser.

18 Claims, 1 Drawing Figure

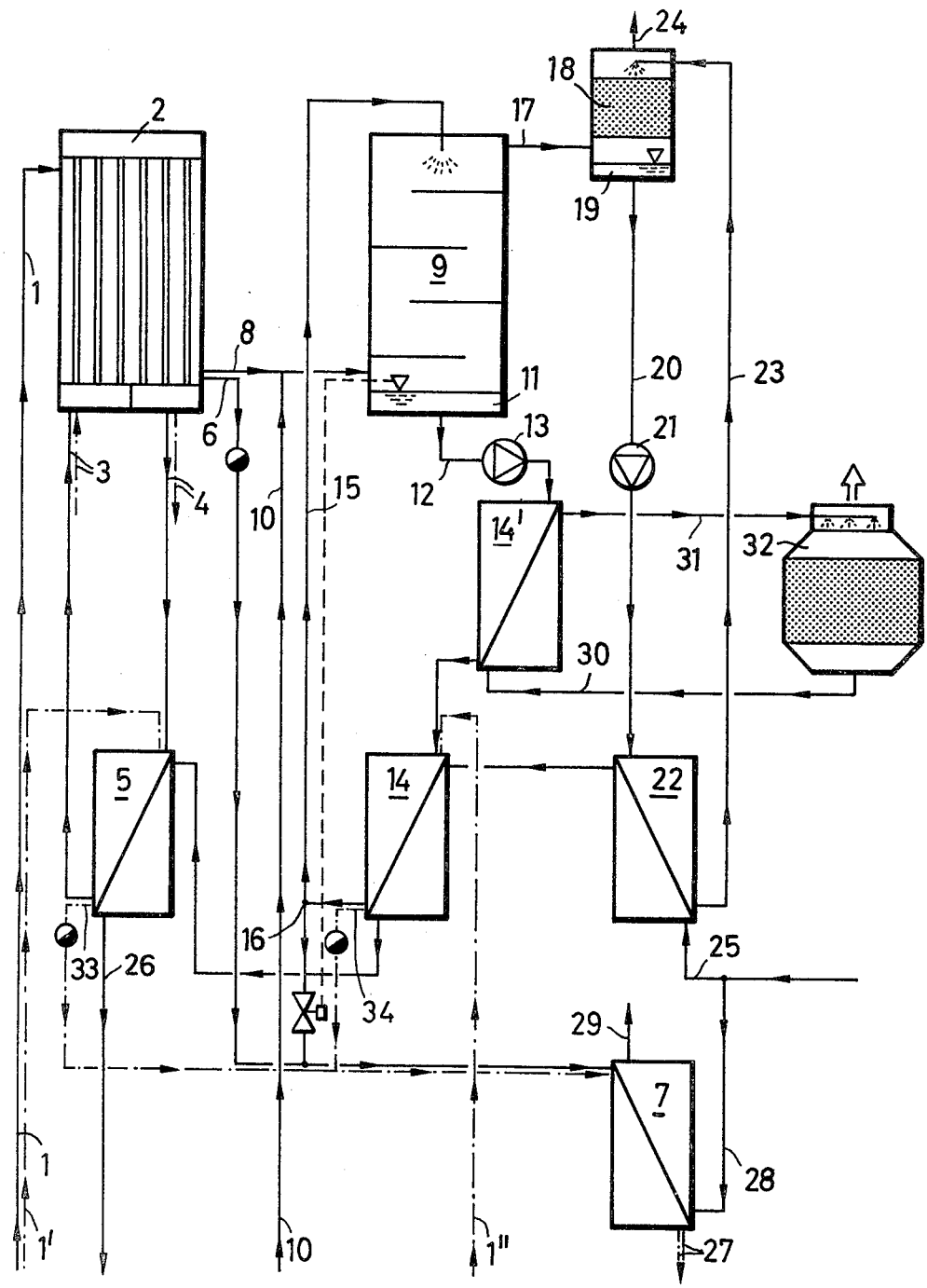

PROCESS AND APPARATUS FOR DISPOSAL OF NOXIOUS VAPORS EMANATING FROM WORT AND MASH DURING PRODUCTION OF BEER IN BREWERY INSTALLATIONS

The present invention relates generally to beer making and more particularly to a process and apparatus for disposing of vapors which are emitted during cooking of wort and treatment of mash in brewery installations. The invention is also directed toward recovering excess energy incident during the production of beer.

During beer production, there will appear at various points in the process vapors which will have a comparatively high heat content. This will occur particularly when a high-temperature continuous-flow cooking process is involved or when there is utilized a process of cooking with external cookers on the wort pans. For some time, consideration has been given to the achievement of useful recovery of the energy involved in such processes. It has been suggested by W. Felgenträger in "Brauwelt" 5, 1980, pages 140 ff. to utilize recovered energy in absorption refrigeration installations with compressors and/or in expansion turbines. Since in such procedures, particularly those involving substances with a high boiling point, there is already created sufficient hot water to meet the internal requirements of the brewery, large investments as suggested previously are necessary in order to sensibly recover whatever excess heat remains.

In the case of the example discussed above, in "Brauwelt" 15, 1979, pages 492 ff. wherein high temperature wort cooking is described and wherein the vapors from such wort cooking have a very low air content, it has been found that such vapors can be used quite readily in heat exchangers. In addition to such vapors, there also will occur vapors from a mash pan having a certain energy level which may also be productively utilized.

The vapors incident to both sources have in common the fact that they are permeated with a relatively high content of flavor ingredients and odor substances which cannot be readily dissipated into the atmosphere of the brewery.

Accordingly, the invention is directed toward an approach which will make possible the economical recovery of excess energy incident in beer production while at the same time providing for the processing of vapors emanating during such beer production independently of whether the vapors originate from the cooking of wort or from the treatment of mash, the process and apparatus of the invention operating in such a way that no environmental hazards or odors are produced.

SUMMARY OF THE INVENTION

Briefly, the present invention may be described as a process for disposal of noxious vapors emanating in brewery installations from treatment of wort and mash during the production of beer and for the recovery of excess energy therefrom comprising the steps of passing the vapors emanating from the treatment of wort through first condenser means, passing the vapors emanating from the treatment of mash through second condenser means, and passing at least part of the condensate emitted from the first condenser means through the second condenser means.

The process of the invention provides an advantage in that the vapors which emanate during the production of beer may, independently of their place of origin, be submitted to a preparation process wherein they are simultaneously made viable for heat emission. Noncondensed ingredients and/or noncondensable ingredients can be passed further along in the process in such a way that they can be withdrawn to where further treatment, if necessary, may occur.

As a further development in accordance with the invention, it is provided that co-condensers and/or surface condensers are used as condensers where for example injection condensers have the advantage that during the injection of water, water soluble ingredients can be directly precipitated whereas the noncondensable and/or noncondensed ingredients may also be easily withdrawn from the condensers in the gas dome.

In accordance with the invention it is also provided that coolants be circulated through the condensers from heat exchangers where it is especially expedient if the coolant of the condensers and/or heat exchangers is circulated in a cycle, as is also provided by the present invention. It should be understood that the invention is not limited to the use of a particular coolant. It may utilize water, air, or similar fluids. Similar considerations apply also to the wort which is to be treated, this being the subject matter of the invention and explained in more detail hereinafter.

It is particularly expedient in accordance with the invention that the heat drawn from the coolants in the heat exchangers be withdrawn for further use, it being apparent in terms of further development that water is used as the coolant of the heat exchanger, the water being withdrawn from the process as hot water for external use. By means of this development, the process may be fashioned in a simple manner so that the amount of water withdrawn for industrial use is sufficient for optimal use of the amount of excess heat contained in the process. As a result of the cycle circulation of the cooling medium, necessary amounts can be controlled in a simple manner.

In accordance with the invention it is also provided that the wort which is to be treated be used as a coolant for the heat exchangers, as briefly mentioned above. The heat imparted in the heat exchangers to the wort functioning as a coolant may then serve directly for preheating of the wort so that the energy to be supplied for wort cooking may be used to the optimum degree. This aim is also served by a further feature of the invention which consists in that the heat exchanger is permeated or ventilated directly with at least a part of the vapors given off during the wort treatment. As a further development of the invention it is provided that noncondensed ingredients be prepared in a supplementary treatment step whereas this can occur by means of absorption and/or chemical reaction. If the ingredients are in the form of gases and are noncondensable, then it is provided as a significant development of the invention that these noncondensed ingredients of the residual vapors be extracted in a gas washer or gas scrubber, the provision of such a gas washer according to the invention not being dependent upon the use of special condensers or condensation methods but rather being arranged to make possible the use of such a gas washer additionally in conventional processes of the type in accordance with the invention.

It may also be provided that the washing medium of the gas washer be circulated in a cycle and cooled in a heat exchanger. This method of operation is especially expedient since as a rule the temperature of the noncondensed ingredients is relatively high so that these ingredients are still capable of giving off substantial energy in the gas washer to the washing medium. Such energy may still be made available for example for preheating during the production of hot water for industrial use.

In order to enable the process to be adapted to different possibilities or applications, in accordance with local conditions, the invention also provides that, if necessary, cooling towers and/or air coolers may be used as heat exchangers. Such cooling systems may for example be used when the waste water temperature must be lowered by a certain amount.

It has been shown to be especially expedient if the condensate amounts incident during the disposal of the vapors be used again for the preparation of the wort.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE DRAWING

The single FIGURE of drawing in the application is a schematic circuit diagram illustrating an installation in accordance with the present invention.

DETAILED DESCRIPTION OF THE PREFERRED EMBODIMENTS

Referring now to the drawing, vapors from a wort cooker (not shown) are passed through a supply line 1 to a surface condenser 2. The surface condenser 2 includes a coolant water inlet 3 and a warm water outlet 4. The warm water flowing from the outlet 4 may, for example, be drawn directly from the system for use in industrial applications and this is represented in dotted line at the outlet of the condenser 2. The heated water may also be circulated through a heat exchanger 5, as indicated by the solid line flow path from the condenser 2, and in the heat exchanger 5 the heat of the cooling water or medium from the condenser 2 may be recovered.

The ingredients condensed in the surface condenser 2 are drawn off at a condensate outlet 6 and from there they are passed through a heat exchanger 7. After undergoing cooling in the heat exchanger 7, the cooled condensate is removed from the process apparatus at the condensate outlet 27.

The outlet of the surface condenser 2 is formed with a branched configuration and at least part of the condensate emitted from the condenser 2 may be passed, together with noncondensed ingredients, through a condensate outlet 8 to another condenser 9 which is comprised of an injection condenser.

The injection condenser 9 is also supplied with vapors from a mash pan (not shown) through a line 10, the vapors from the line 10 being introduced into the injection condenser 9 concurrently with the flow from the condenser 2 through the line 8.

Injection cooling water 11 in the condenser 9 is circulated through a cyclical flow path by means of a line 12, a pump 13, a heat exchanger 14, and through a line 15 back to the injection condenser 9. Excess cooling water, that is to say the condensate amount eliminated from the vapors, can be withdrawn from the cooling water cycle after passage through the heat exchanger 14 at an outlet 16. This condensate amount can, if necessary, also be cooled further in the heat exchanger 7 prior to being exhausted at the outlet 27.

In the upper area of this injection condenser 9, there is provided a drain line 17 which leads to a gas washer 18, the washing medium of the gas washer 18 being also passed in a cyclical flow path. The wash medium 19 is passed by means of a line 20 to a pump 21 which conveys it through a heat exchanger 22 back into the gas washer 18 through a line 23. The wash ingredients in gaseous form are passed through a line 24 to a flue (not shown), or the like, and are then released into the environment.

For the production of warm or hot water for industrial usage there are connected in sequence the heat exchangers 22, 14, and 5, as shown in the drawing. Cooling water is introduced at an inlet 25 into the heat exchanger 22 which is permeated by the wash medium and the water leaves the heat exchanger 5 permeated by cooling water in the form of hot water at an outlet 26.

If desired, the cooler 7 for the removed condensate quantities, to which the cooling water is fed at 28 and from which it is drawn off at 29, may be connected in series with the heat exchangers 22, 14, and 4. Conversely, heat exchangers 22, 14 and 5 may also be connected in parallel or they may be connected partially in parallel and partially in series.

In order that the heat drawn from the condensation installation may always be adapted with varying hot and/or warm water requirements, to heat given off during the wort cooking and the mash treatment, without odoriferous vapors penetrating into the environment (without condensing), there is installed additionally in the cooling water cycle of the injection condenser 9 a heat exchanger 14'. Through the heat exchanger 14' there occurs a through-flow by means of inlet and outlet lines 30 and 31 of cooling water which in the cycle is passed through a dry air cooler or wet air cooler which may for example be the cooling tower 32 depicted in the drawing where there is given off the absorbed heat into the environment without noxious odors.

Aside from the use of two different condensers represented in the drawings, there may also be provided in place of the surface condenser 2 an injection condenser, the warm water outlet 4 of such an injection condenser being then fed through the heat exchanger 5 according to the cooling water cycle represented in the drawing.

Of course, the embodiment described of the depicted installation in accordance with the invention may be altered in many respects without departing from the fundamental concepts of the invention. In particular, there may be provided in the heat exchangers 5, 14, and 22 in the cooling cycles of the vapor disposal installation, a through-flow between the inlet 25 and the outlet 26 of the wort to be preheated for cooking instead of cooling water. The same purpose may also be served by the division of the cooling of these heat exchangers into a combination of water-cooling and wort-cooling, for instance by a cooling of the heat exchangers 14 and 22 with cooling water for the preparation of hot water and a cooling of the heat exchanger 5 with wort for the preheating of the wort to be cooled.

Finally, for the purpose of relieving the condensers, the heat exchangers 5 and 14 may also be permeated or ventilated on the side of the warmer medium directly with the odors of the wort cooking, for example in accordance with flow paths indicated by dash-dot lines in the drawings. Particularly, in the case where the heat exchangers 5 and 14 are cooled by the wort which is to be preheated, they may thus alternatively also be used in a continuous through-flow cooking process, except in the conventional intermittent (step-by-step) wort cooking.

For this purpose, the heat exchanger 5 may, for example, be permeated with wort vapors 1' of a first relief stage and the heat exchanger 14 may be permeated or ventilated by wort vapors 1" of a second relief stage, with both being cooled by the advancing wort which is to be heated. The condensates of the wort vapors emerging at outlets 33 and 34 may be further cooled in the heat exchanger 7 and they may thus serve for the preparation of warm water.

In a similar fashion, during conventional intermittent wort cooking, the heat exchanger 5 may serve as well, for example, for preheating of the wort of a cooking pan with the assistance of the condensing wort vapors of a second wort pan in the cooking process. For this purpose, the wort of a first pan may be led in the cycle through the heat exchanger 5, while the heating side of the heat exchanger is permeated by heated vapors of the second pan. The actual vapor condenser 2 and possible additional present condensers and heat exchangers may then serve for hot water production from the condensation heat of the vapors being generated during the wort cooking, this condensation heat exceeding the heat necessary for preheating of the wort.

While specific embodiments of the invention have been shown and described in detail to illustrate the application of the inventive principles, it will be understood that the invention may be embodied otherwise without departing from such principles.

What is claimed is:

1. A process for disposal of noxious vapors emanating in brewery installations from cooking of wort and mash during the production of beer and for recovery of excess energy therefrom comprising the steps of: cooking wort and mash and developing vapors therefrom; passing said vapors emanating from said cooking of wort through first condenser means; passing said vapors emanating from said cooking of mash through second condenser means; passing at least part of the exhaust emitted from said first condenser means through said second condenser means; and recovering a vapor from said process.

2. A process according to claim 1 wherein condensate developed in said process during disposal of said vapors is reused for preparation of wort.

3. A process according to claim 1 wherein said first condenser means comprise a surface condenser and wherein said second condenser means comprise a cooling water injection condenser.

4. A process according to claim 1 wherein coolant is passed through said first and second condenser means, said coolant being also passed through heat exchangers.

5. A process according to claim 4 wherein said coolant is circulated in a cyclical path through said first and second condenser means and through said heat exchangers.

6. A process according to claim 5 wherein heat is withdrawn from said coolant in said heat exchangers through a heat exchange fluid and is applied for purposes of external use.

7. A process according to claim 6 wherein water is used as the coolant in said heat exchangers and is withdrawn from said process as hot water for external use.

8. A process according to claim 6 wherein wort is used as a coolant for said heat exchangers.

9. A process according to claim 4 wherein said heat exchangers comprise a cooling tower.

10. A process according to claim 1 wherein noncondensed ingredients from said first and second condenser means are prepared for cooking in a further stage by absorption or a chemical reaction.

11. A process according to claim 10 wherein said noncondensed ingredients are extracted from residual vapors in a gas washer.

12. A process according to claim 11 wherein a washing medium of said gas washer is circulated in a cyclical path and cooled in a heat exchanger.

13. Apparatus for disposal of noxious vapors emanating in brewery installations from cooking of wort and mash during the production of beer and for recovery of excess energy therefrom comprising: wort and mash cooking means; first condenser means arranged to receive vapor emitted from the cooking of wort in said brewery installation; second condenser means arranged to receive vapors emitted from the cooking of mash in said brewery installation; branch means connecting said first condenser means in flow communication with said second condenser means means for passing at least a part of the condensed vapors emitted from said first condenser means into said second condenser means; first coolant flow means including a first heat exchanger for circulating coolant through said first condenser means; second coolant flow means including a second heat exchanger for circulating coolant through said second condenser means; and means for removing condensate and vapor from said apparatus.

14. Apparatus according to claim 13 further comprising means connecting said first and second heat exchangers in one of a series flow path or parallel flow path for the production of hot water for industrial use.

15. Apparatus according to claim 13 wherein said first condenser means is a surface condenser and wherein said condenser means is a cooling water injection condenser.

16. Apparatus according to claim 13 or 15 wherein there is connected in sequence with said second condenser means a gas washer defining a detergent cycle for treatment of noncondensable residual vapors in a gaseous state, there being provided in said detergent cycle of said gas washer a heat exchanger.

17. Apparatus according to claim 13 further including means defining at least one coolant circulation cycle having a further heat exchanger, the coolant of said heat exchanger being passed in said cycle through a cooling tower.

18. Apparatus according to claim 17 further comprising drain lines for condensate flowing from said first condenser means and from said second heat exchanger, an additional heat exchanger with means arranging said additional heat exchanger in one of a parallel or series flow path with said first and second heat exchangers, said drain lines being connected with said additional heat exchanger.

* * * * *